United States Patent
Reid et al.

(10) Patent No.: US 10,108,957 B2
(45) Date of Patent: *Oct. 23, 2018

(54) METHOD AND SYSTEM FOR USING PAYMENT HISTORY FOR CONDUCTING COMMERCIAL TRANSACTIONS

(75) Inventors: William Reid, Castro Valley, CA (US); Fredric Maslin, San Francisco, CA (US); Craig Swackhammer, Singapore (SG); Marc Belsky, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 377 days.

This patent is subject to a terminal disclaimer.

(21) Appl. No.: 13/439,555

(22) Filed: Apr. 4, 2012

(65) Prior Publication Data

US 2012/0253975 A1    Oct. 4, 2012

Related U.S. Application Data

(63) Continuation of application No. 11/561,130, filed on Nov. 17, 2006, now Pat. No. 8,175,961.

(51) Int. Cl.
*G06Q 20/40* (2012.01)
*G06Q 20/10* (2012.01)
(Continued)

(52) U.S. Cl.
CPC ............ *G06Q 20/40* (2013.01); *G06Q 20/10* (2013.01); *G06Q 20/4016* (2013.01);
(Continued)

(58) Field of Classification Search
USPC .............................................. 705/26, 35–44
See application file for complete search history.

(56) References Cited

U.S. PATENT DOCUMENTS

| 5,732,400 A | 3/1998 | Mandler et al. |
| 5,953,710 A * | 9/1999 | Fleming ......................... 705/38 |

(Continued)

FOREIGN PATENT DOCUMENTS

| WO | 03/001866 | 1/2003 |
| WO | 03/038553 | 5/2003 |

(Continued)

OTHER PUBLICATIONS

The European Search Report for Application No. EP07863487.0, dated Mar. 11, 2011, 3 pages.

*Primary Examiner* — Alexander G Kalinowski
*Assistant Examiner* — Hatem M Ali
(74) *Attorney, Agent, or Firm* — Kilpatrick, Townsend & Stockton LLP

(57) ABSTRACT

A method is disclosed. The method includes receiving transaction data relating to a plurality of commercial transactions conducted by a plurality of buyers and sellers conducting commercial transactions using a transaction processing system, and then receiving a request for transaction information relating to the received transaction data from an entity, wherein the transaction information also relates to a commercial transaction between a buyer and a seller. The method further includes providing the transaction information to an entity, wherein the entity thereafter makes a decision about further interacting with the buyer or the seller.

22 Claims, 13 Drawing Sheets

(51) Int. Cl.
　　　*G06Q 30/02*　　　(2012.01)
　　　*G06Q 40/02*　　　(2012.01)
　　　*G06Q 40/04*　　　(2012.01)

(52) U.S. Cl.
　　　CPC ............ *G06Q 30/02* (2013.01); *G06Q 40/025* (2013.01); *G06Q 40/04* (2013.01)

(56) References Cited

U.S. PATENT DOCUMENTS

| | | | |
|---|---|---|---|
| 7,536,354 B1 * | 5/2009 | deGroeve | G06Q 20/10 705/34 |
| 2002/0046169 A1 * | 4/2002 | Keresman, III | G06Q 20/04 705/41 |
| 2002/0099655 A1 | 7/2002 | Melchior et al. | |
| 2002/0152123 A1 * | 10/2002 | Giordano | B60R 21/213 705/14.64 |
| 2002/0198833 A1 | 12/2002 | Wohlstadter et al. | |
| 2004/0111346 A1 | 6/2004 | Macbeath et al. | |
| 2004/0139021 A1 | 7/2004 | Reed et al. | |
| 2004/0181493 A1 * | 9/2004 | Cross et al. | 705/75 |
| 2005/0049963 A1 * | 3/2005 | Barry | G06Q 20/02 705/39 |
| 2005/0246290 A1 | 11/2005 | Kausik | |
| 2005/0283416 A1 | 12/2005 | Reid et al. | |
| 2005/0283430 A1 | 12/2005 | Reid et al. | |
| 2005/0283431 A1 | 12/2005 | Reid et al. | |
| 2005/0283432 A1 | 12/2005 | Reid et al. | |
| 2005/0283433 A1 | 12/2005 | Reid et al. | |
| 2006/0155644 A1 | 7/2006 | Reid et al. | |
| 2007/0061260 A1 | 3/2007 | deGroeve et al. | |
| 2009/0319422 A1 * | 12/2009 | Bushman et al. | 705/40 |

FOREIGN PATENT DOCUMENTS

| | | | |
|---|---|---|---|
| WO | WO 2004051394 A2 * | 6/2004 | ............ G06Q 20/04 |
| WO | 2006/076503 | 7/2006 | |
| WO | 2008/063810 | 5/2008 | |

* cited by examiner

METHOD AND SYSTEM FOR USING PAYMENT HISTORY FOR CONDUCTING COMMERCIAL TRANSACTIONS

CROSS-REFERENCES TO RELATED APPLICATIONS

This application is a continuation of U.S. patent application Ser. No. 11/561,130 filed on Nov. 17, 2006, entitled, "Method and System for Using Payment History for Conducting Commercial Transactions", the disclosure of which is hereby incorporated by reference in its entirety for all purposes.

BACKGROUND OF THE INVENTION

In a typical commercial transaction between a buyer and a seller, the buyer may contract to buy goods from a seller. The contract may require that the seller ship the goods to the buyer on a predetermined shipment date and it may also require the buyer to pay a contract amount for the goods on a predetermined contract payment due date.

In some cases, the seller may be willing to accept less than the contract amount, in exchange for an earlier payment. For example, a buyer may form a contract with a seller to purchase 1000 computer monitors from the seller for $300,000. The contracted payment due date may be December 1. The seller, however, may be willing to accept a 10% discount, or $270,000, for the computer monitors if the seller can receive the discounted payment by June 1.

If buyer is not willing to pay for the goods any earlier than the contract due date, a financing entity such as the buyer's bank may be willing to advance a discounted payment amount to the seller in advance of the contracted due date in exchange for the right to receive the full contract amount on the contract payment due date. For example, in the above example, the buyer's bank may be willing to send the discounted amount of $270,000 to the seller on June 1, in exchange for the right to receive the $300,000 contracted amount on December 1. Assuming that the buyer pays the $300,000 on the contracted payment date, the buyer bank would receive the difference between the contracted amount and the discounted amount (here $30,000) as compensation for financing the commercial transaction.

The buyer bank's decision as to whether or not to advance the seller the discounted amount in advance of the contracted payment due date depends on the creditworthiness of the buyer. For example, if the buyer is not very creditworthy, then the buyer bank may conclude that it is not likely that the buyer will pay the contracted amount on time and/or in full, and that it is consequently too risky to send the advance discounted payment to the seller. On the other hand, if the buyer bank determines that the buyer is a good credit risk, then the buyer bank may determine that the risk of not getting paid is low and the buyer bank may consequently send the advance payment to seller.

Conventional credit scores could be used by the buyer bank to determine whether or not to advance funds to the seller. Conventional credit scores, however, are generic and may not give the buyer bank sufficient information about the risk of not getting paid by the buyer. For example, generic credit scores are formulated by reviewing the payment histories for all payments made by buyers for direct and indirect expenses (e.g., utilities, debts, and other payments). If a buyer has a history of delaying the payment on some types of invoices, but not others, the generic conventional credit score may not adequately inform the buyer bank of the buyer bank's risk.

Illustratively, a buyer may pay utility invoices (e.g., for electricity) on time 100% of the time, raw material invoices on time 95% of the time, and office equipment invoices on time 40% of the time. The buyer's generic credit score may be high, since most of the buyer's invoices are paid on time. If the buyer bank is considering advancing payment to a seller based on a contract by a buyer to buy office equipment from the seller, the buyer's generic credit score may indicate that the buyer is a good credit risk, even though the buyer is a bad credit risk when office equipment purchase contracts are involved.

In addition, as a practical matter, credit information is difficult to obtain and/or may not be current or timely. This is particularly true if the buyers and sellers are in different jurisdictions and/or foreign countries, or if they are new and have not developed suitable transaction histories. In such cases, the sellers or financing entities may not have access to any reliable credit reports, let alone credit reports that are accurate and allow them to make informed decisions relating to specific commercial transactions.

In addition to this problem, there are other problems with conventional financing systems. Sometimes, the sellers of goods and services would like to receive financing offers, but there is no convenient forum that allows sellers to conveniently find willing financing entities who might be willing to finance their commercial transactions. Conversely, financing entities such as banks may want to offer financing to buyers and sellers, but may not know how to contact willing buyers and sellers.

Embodiments of the invention address these and other problems.

SUMMARY THE OF INVENTION

Embodiments of the invention are directed to methods, systems, and computer readable media that can utilize the payment histories of a plurality of commercial transactions conducted by an electronic transaction processing system. Decisions such as financing decisions and shipping decisions can be made using the payment histories.

One embodiment of the invention is directed to a method. The method comprises receiving transaction data relating to a plurality of commercial transactions conducted by a plurality of buyers and sellers conducting commercial transactions using a transaction processing system, and receiving a request for transaction information relating to the received transaction data from an entity. The transaction information relates to a commercial transaction between a buyer and a seller, and may comprise information including a risk rating. The transaction information is provided to an entity, which can thereafter make a decision about further interaction with the buyer or the seller. For example, the entity may be a financing entity such as a bank, and the bank can decide whether or not to advance funds to a seller on behalf of the buyer after reviewing the transaction information.

Another embodiment of the invention is directed to a computer readable medium comprising: code for receiving transaction data relating to a plurality of commercial transactions conducted by a plurality of buyers and sellers conducting commercial transactions using a transaction processing system; code for receiving a request for transaction information relating to the received transaction data from an entity, wherein the transaction information also relates to a commercial transaction between a buyer and a seller; and code for providing the transaction information to an entity, wherein the entity thereafter make a decision about further interacting with the buyer or the seller.

Other embodiments of the invention are directed to server computers and systems using the above described methods and computer readable media.

These and other embodiments of the invention are described in further detail below.

DETAILED DESCRIPTION

Figure 1A:
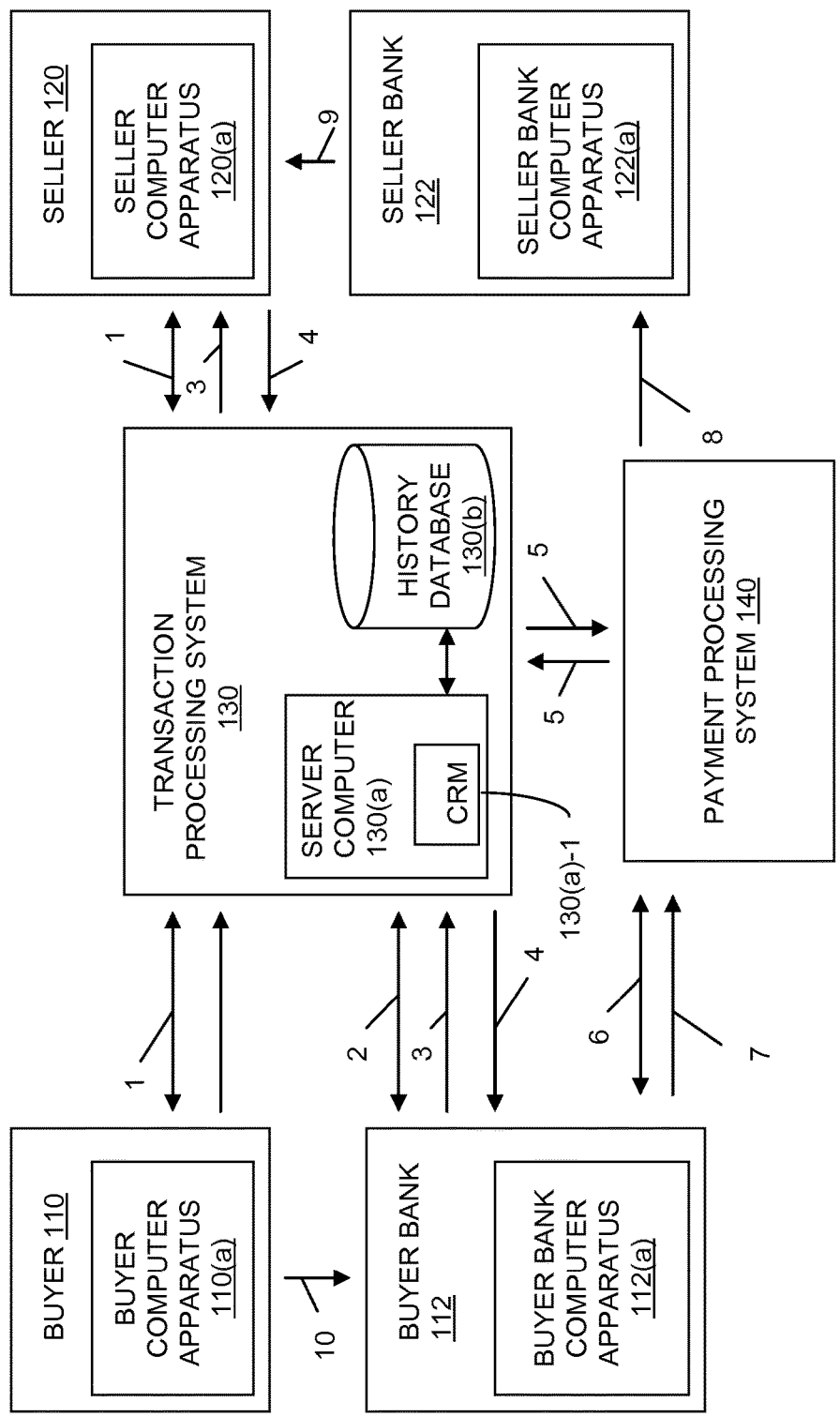
FIG. 1(a) shows a block diagram of a system according to an embodiment of the invention. A payment history receivables discounting process flow is also illustrated.

One embodiment of the invention is directed to a method. The method comprises receiving transaction data relating to a plurality of commercial transactions conducted by a plurality of buyers and sellers conducting commercial transactions using a transaction processing system. The commercial transactions conducted by the buyer may be those that may involve a number of different sellers over time. The commercial transactions conducted by the seller may also involve a number of different buyers over time. Over time, transaction profiles of the buyers and sellers may be collected by the transaction processing system and stored in a history database. Specific histories as to how and when the buyers and sellers conduct commercial transactions can be stored in the history database.

After (or before) the transaction data are received by the transaction processing system, a request for transaction information relating to the received transaction data is received from an entity such as a financing bank. The transaction information that is sent to the entity may include raw transaction data or processed transaction data. The transaction information may be sent to the requesting entity in response to a specific request for transaction information from that entity. Alternatively, the transaction information may be pushed to the entity in response to a prior request by the entity.

The transaction information may comprise any suitable type of information derived from the received transaction data. For example, the transaction information may comprise raw transaction data, and/or manipulated transaction data. For instance, the transaction data that is received by the transaction processing system may be for a particular buyer and may be manipulated (analyzed, calculated, etc.) by the transaction processing system to form a risk rating for the particular buyer. The risk rating may indicate whether or not the buyer is or is not likely to pay for a particular type of product on a specified due date.

The requesting entity (e.g., a buyer bank) may thereafter receive the transaction information, and can thereafter make a decision about whether or how to further interact with the buyer and/or the seller. For example, the transaction information may comprise a risk rating that is determined using the received transaction data. If the buyer has a low risk rating, then a buyer bank may decide to offer to pay the seller a discounted amount for a commercial transaction early in exchange for the right to receive the full amount due by the buyer for the commercial transaction at a later date. If the buyer has a high risk rating, then the buyer bank may decide that the risk of not getting paid by the buyer is too high, and may consequently not participate in the commercial transaction being conducted by the buyer.

A number of examples of specific embodiments of the invention are described in detail below, and embodiments of the invention are not limited thereto. For example, a number of systems and methods are described. Systems according to embodiments of the invention may include more or less components than are specifically described. For example, although the systems that are described include buyers and sellers, other systems according to embodiments of the invention may not include buyers and/or sellers. In addition, the specific methods that are described below may include more or less steps than are specifically described.

FIG. 1(a) shows a system according to an embodiment of the invention. The system shown in FIG. 1(a) may be used in a payment history receivables discounting process. In a typical payment history receivables process, a financing entity may advance funds to a seller in exchange for the right to receive payment from a buyer on a contract payment due date.

The system shown in FIG. 1(a) comprises a buyer 110, associated with a buyer bank 112, and a seller 120 associated with a seller bank 122. The buyer 110 may have an account with the buyer bank 112 and the seller 120 may have an account with the seller bank 122.

The buyer 110, the buyer bank 112, the seller 120, and the seller bank 122 may be in communication with a transaction processing system 130 and a payment processing system 140. The payment processing system 140 may, in turn, be in operative communication with the transaction processing system 130. In FIG. 1(a) and in other Figures, one buyer, one seller, one buyer bank, and one seller bank are shown for clarity of illustration. However, in embodiments of the invention, many buyers, buyer banks, sellers, and seller banks may be in (direct or indirect) communication with the transaction processing system 130 and the payment processing system 140. In addition, embodiments of the invention are also not limited to systems including only a single transaction processing system and/or a single payment processing system.

The buyer 110 and the seller 120 may be entities having any suitable characteristics. For example, the buyer 110 and the seller 120 may comprise corporations, organizations, individuals, etc. The buyer 100 and the seller 120 may be two of hundreds or even thousands of buyers and sellers that may conduct commercial transactions using the transaction processing system 130 and/or the payment processing system 140. Such commercial transactions may involve the sale of goods and/or services.

The buyer bank 112 may be referred to as an "issuer" in some cases, while the seller bank 122 may be referred to as an "acquirer" in some cases. Although a buyer bank 112 and a seller bank 122 are shown in FIG. 1(a), it is understood that hundreds or even thousands of banks or other types of financial entities may be used instead of or in addition to the buyer bank 112 and the seller bank 122. For example, non-bank entities such as corporations, non-profit organizations, governments, or associations may advance payments to sellers and may collect receivables from buyers in other embodiments of the invention.

The transaction processing system 130 may comprise any suitable type of system which can process commercial transactions between a plurality of buyers and sellers. In preferred embodiments, the transaction processing system comprises various functional elements including a database of supplier invoices with payment terms and conditions, an invoice preprocessor, a payment manager module, a database of transaction fee terms and conditions, an issuer pricing engine, an authorization and settlements interface, and a payment results processing module. Other specific details regarding exemplary transaction processing systems can be found in U.S. patent application Ser. No. 10/020,466, filed on Oct. 29, 2001, and also WO 03/038553, both of which are herein incorporated by reference in their entirety for all purposes.

The payment processing system 140 may comprise any suitable system which can process electronic payments. In preferred embodiments, the payment processing system 140 may be adapted to process typical debit or credit card transactions conducted by ordinary consumers. The payment processing system 140 may also be adapted to perform clearing and settlement processes. An exemplary payment processing system may comprise VisaNet™.

The transaction processing system 130 may comprise a server computer 130(a) which may comprise a computer readable medium or CRM 130(a)-1. The server computer 130(a) may be operatively coupled to a history database 130(b). The history database 130(b) may store data from a plurality of commercial transactions. The data may include prior transaction information, prior payment information, and output data such as a risk rating.

As used herein, a "server computer" may be embodied by one or more computational apparatuses, which can service the requests of one or more client computers or other computer apparatuses. Typically, a server computer or host computer is a powerful computer or cluster of computers that behave as a single computer. For example, the server computer 130(a) can be a mainframe computer, a minicomputer, or a minicomputer cluster. In another example, the server computer 130(a) may include one or more database servers and one or more Web servers. The server computer 130(a) may service the requests of one or more client computers.

Any suitable communication media may be used to allow the various entities and components shown in FIG. 1(a) to communicate with each other, including any suitable combination of communication lines, channels, and radio interfaces. According to one embodiment, the communication media may include, for example, the Internet, an intranet, the public switched telephone network (PSTN), or a wireless telephone or radio network. According to one embodiment, the server computer 130(a) and various computer apparatuses (e.g., computer apparatus 110(a)) may communicate through communication media using a TCP/IP based protocol.

The buyer 110, the seller 120, the buyer bank 112, and the seller bank 122, may each have at least one computer apparatus 110(a), 120(a), 112(a), 122(a). These computer apparatuses 110(a), 120(a), 112(a), 122(a) allow the buyer 110, the seller 120, the buyer bank 112, and the seller bank 122 to electronically communicate with the transaction processing system 130 and the payment processing system 140.

Figure 1B:
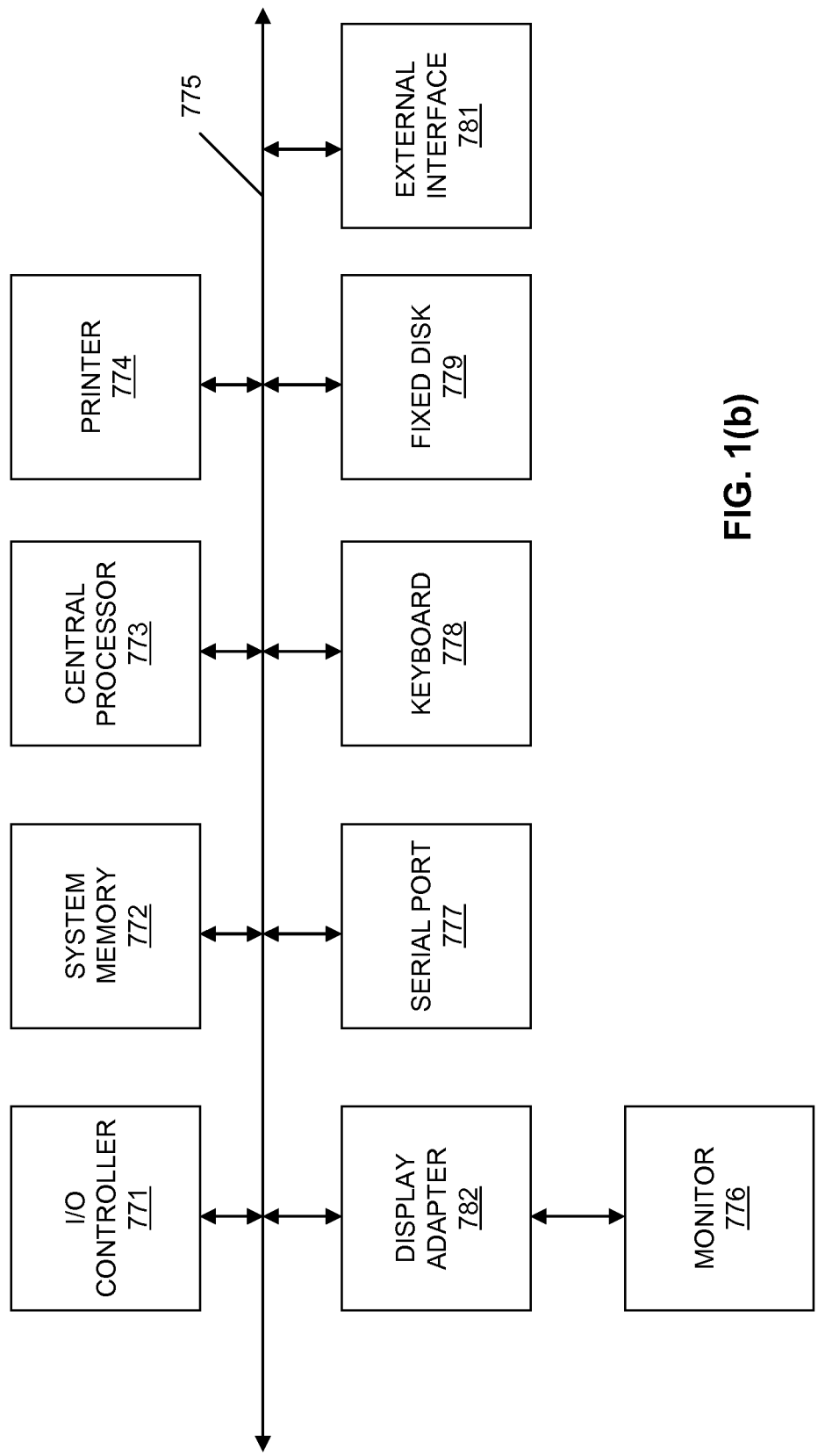
FIG. 1(b) shows a block diagram of some components of a computer apparatus according to an embodiment of the invention.

Any of the computer apparatuses 110(a), 120(a), 112(a), 122(a), or even components in the transaction processing system 130 and the payment processing system 140, such as the server computer 130(a), may utilize any suitable number of subsystems. Examples of such subsystems or components are shown in FIG. 1(b). The subsystems shown in FIG. 1(b) are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

The results of any part of the methods according to embodiments of the invention may be output on any of the output devices shown in FIG. 1(b) and may be used by the entities operating the output devices. For example, a buyer bank may have a printer or monitor, which will allow the buyer bank to review a risk rating for a buyer when making a determination as to whether or not to advance funds to a seller on behalf of a buyer that is in a commercial transaction with the seller.

Figure 1C:
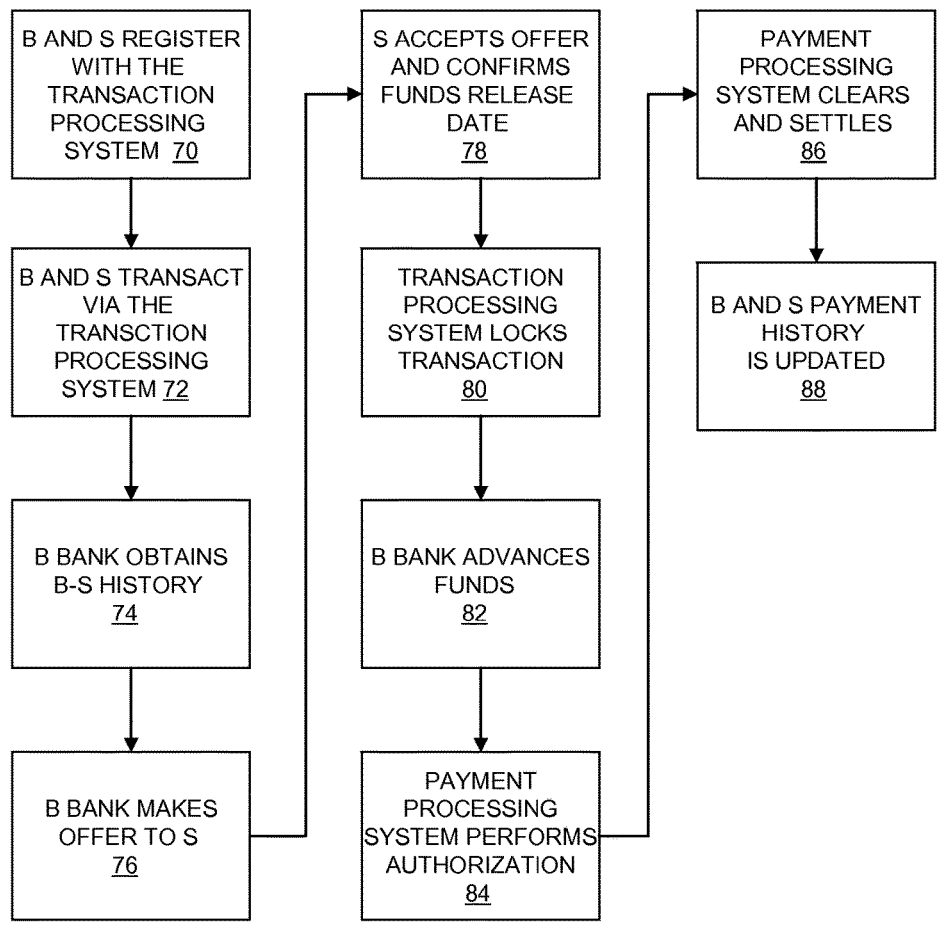
FIG. 1(c) shows a flowchart illustrating the steps in a payment history receivables discounting process flow according to an embodiment of the invention.

A payment history receivables discounting method can be described with reference to FIGS. 1(a) and 1(c). First, the buyer 110 and the seller 120 register with the transaction processing system 130 (step 70). In addition, other buyers and sellers (not shown) who will or have interacted with the buyer 110 and the seller 120 can also register with the transaction processing system 130.

After the buyer 110 and the seller 120 register with the transaction processing system 130, as shown by reference number 1 in FIG. 1(a), the buyer 110, the seller 120, and various other buyers and sellers (not shown) conduct commercial transactions using the transaction processing system 130 (step 72). As they conduct commercial transactions using the transaction processing system 130, the buyer 110 and the seller 120 build payment and transaction histories. The payment and transaction histories for the various buyers and sellers using the transaction processing system 130 are stored by the server computer 130(*a*) in the history database 130(*b*). Transaction profiles may optionally be built for the buyer 110 and the seller 120, and these transaction profiles may be stored in the history database 130(*b*).

At some point in time (e.g., after the buyer 110 and the seller 120 develop transactional histories), the buyer 110 and the seller 120 enter into a specific commercial transaction using the transaction processing system 130. For example, the seller 120 may form a contract with the buyer 110 to supply 1000 computer monitors to the buyer 110. The buyer 110 may agree to pay $300,000 for the 1000 computer monitors on December 1. Contract terms and conditions, including the contract amount and any payment due date(s) are stored in the transaction processing system 130.

As shown by reference number 2 in FIG. 1(*a*), the buyer bank 112 is notified of the commercial transaction between the buyer 110 and the seller 120. The buyer bank 112 then obtains transaction information relating to the buyer 110 from the transaction processing system 130 (step 74). As noted above, the buyer bank 112 may simply request the transaction information (e.g., via e-mail), and the transaction information may be sent by the transaction processing system 130 to the buyer bank 112. Alternatively, the transaction information may be pushed to the buyer bank 112 without an initial or immediately preceding request for the transaction information.

The transaction information obtained by the buyer bank 112 may include any suitable type of information. In embodiments of the invention, the transaction information may comprise past transaction information relating to the buyer 110 or the seller 120, current transaction information regarding the current transaction between the buyer 110 and the seller 120, and processed information that can help the buyer bank 112 make decisions. For example, transaction information may comprise information about the buyer or seller, payment information, and output data such as a risk rating.

The transaction processing system 130 can keep track of information that can be useful for entities such as banks to help evaluate risk. For example, transaction information may include the following: payable and/or receivable information; average transaction size or specific transaction size; average outstanding receivables and/or payables; current outstanding receivables or payables; average payment times; average and current net positions (AP/AR); country of origination/destination; tranches; average payment timing stratified by commodity/service; aging reporting; and weighted average of outstanding accounts payable and accounts receivable. Transaction information may also include payment information such as late payment, short payment, payments declined for insufficient funds, and delinquencies from bank financing. Lastly, transaction information may also include calculated or determined outputs including individual statistics, and calculation of a weighted ranking based upon an entity's transaction history. Information can also be tracked by transaction frequency (e.g., 30 days, 60 days, 90 days, or life) if desired.

In embodiments of the invention, entities such as banks can either log-in and search or receive files using the transaction processing system 130. A bank can request information from the transaction processing system or can provide its own weighting model. It is also possible to update an entity's acceptance profile to automatically offer financing if the buyer has a risk rating above a predetermined risk rating (e.g., a bank's profile may say "provide financing if the buyer has a risk rating score above X" or "provide financing if these specific parameters are met."). As noted above, a bank can use this and other information to make credit decisions and identify sources for asset financing/collateral.

The transaction information received may also be specifically applicable or relevant to the current transaction between the buyer 110 and the seller 120. For example, the buyer 110 may have exhibited a pattern of paying on time when the payment relates to one type of purchase (e.g., electricity), but not another (e.g., legal services). In another example, the buyer 110 may have a tendency to pay larger invoices on time and in full more often than smaller invoices. Any of these buying patterns may be recognized by the transaction processing system 130 and may be stored in the history database 130(*b*). In some embodiments, the server computer 130(*a*) may use any of the above information to create a risk rating that quantifies the risk of the buyer paying on time and in full for a particular transaction. The risk rating may be in the form of a number or letter grade so that an end user can easily differentiate good risks from bad risks.

After the transaction information is obtained by the buyer bank 112, the buyer bank 112 then makes a decision regarding whether to offer advance payment to the seller 120 on the commercial transaction. As shown by reference number 3 in FIG. 1(*a*), if the risk is acceptable to the buyer bank 112, then the buyer bank 112 makes a financing offer to the seller 120 (step 76). For example, if the seller 120 is expecting to receive $300,000 on December 1 for the shipment of 1000 computer monitors, the buyer bank 112 may offer to pay the seller 120 $270,000 at an earlier date (e.g., on June 1), in exchange for the right to receive the full $300,000 from the buyer 110 on December 1.

After the offer of advance payment is made to the seller 120, as shown by reference number 4 in FIG. 1(*a*), the seller 120 may accept the offer of advance payment by the buyer bank 112 (step 78).

After the seller 120 accepts the offer of advanced payment, the transaction processing system 130 thereafter "locks down" the transaction. That is, the terms of the transaction between the buyer 110, the seller 120, and the buyer bank 112 cannot thereafter be modified.

On the agreed payment advance date, the buyer bank 112 then advances funds to the seller 120 (step 82). The funds may be advanced using the payment processing system 140 and the transaction processing system 130. Reference number 5 in FIG. 1(*a*) shows messaging that can occur between the transaction processing system 130 and the payment processing system 140 to initiate the transfer of funds. In one embodiment, the payment processing system 140 may perform an authorization process (step 84). As shown by reference numeral 6 in FIG. 1(*a*), the payment processing system 140 may send an authorization request message to the buyer bank 112 requesting authorization for the funds transfer. If approved, the buyer bank 112 may then send back an authorization response message approving of the advance payment.

After the buyer bank 112 approves of the advance payment, a clearing and settlement process is performed (step 86) as shown by reference numbers 7 and 8 in FIG. 1(*a*). The funds are then sent to the seller bank 120. The seller's account is then credited as shown by reference number 9 in FIG. 1(*a*).

Authorization and settlement processes are used in credit card transactions. As background, in the context of a credit card transaction, an electronic payment can be separated into two parts: an authorization process, and a clearing and settlement process. The authorization process occurs in substantially real time (e.g., in a few seconds, such as less than 10 seconds) when a consumer purchases a good or service at a point of sale, while the clearing and settlement process occurs later. In the authorization process, a payment processing system checks the consumer's line of credit or funds in the consumer's account, and relays this information back to the merchant to inform the merchant and the consumer as to whether or not the consumer has sufficient credit or funds to conduct the desired transaction. In the clearing and settlement process, the payment processing system consolidates various transactions between different acquirers and issuers and settles accounts among them. Actual funds can be transferred during the clearing and settlement process. This process is usually completed within two or three days from the date that a purchase is made by a consumer. The consumer is then subsequently billed for the purchase in a periodic statement of the consumer's account.

Referring again to FIG. 1(a), as shown by reference number 10, on the contract payment date, the buyer 110 sends a payment for the contract amount to the buyer bank 112, instead of to the seller 120 or the seller bank 122. For example, in the previously described example, the buyer 110 may send the $300,000 for the 1000 computer monitors supplied by the seller to the buyer bank 112, instead of to the seller 120 or the seller bank 122, on December 1. Assuming that the transaction between the buyer bank 112, the seller 120, and the buyer 110 occurs as planned, the buyer bank 112 will net $30,000 for advancing payment to the seller 120.

After the transaction is completed, the history database 130(b) is updated (step 88). For example, if the buyer 110 paid the contract amount on time (i.e., on the contract due date), then the buyer's transaction history would be updated in the history database 130(b) to reflect this. If the buyer 110 was not paid on time, the transaction history could be updated in the history database 130(b) to reflect this as well. Characteristics of the buyer's transactional behavior which may be recorded in the history database 130(b) may include: whether or not the buyer paid on time or at all; whether the buyer pays for some types of products in a timelier manner than other types of products, how long the buyer takes to pay invoices, etc.

Figure 2A:
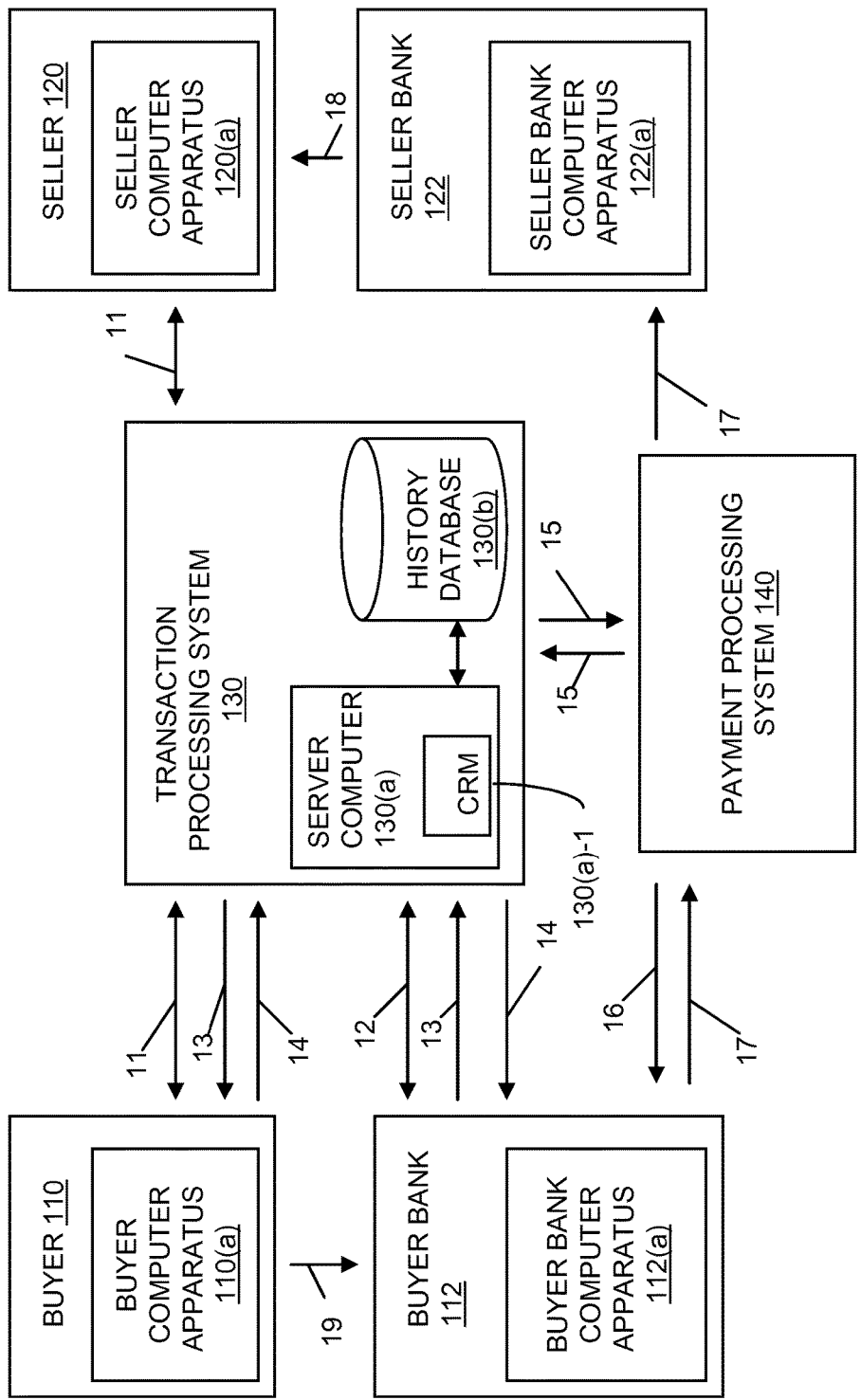
FIG. 2(a) shows a block diagram of a system. A payment history payables discounting process flow is also illustrated.

A payment history payables discounting process can be described with reference to FIGS. 2(a) and 2(b). FIG. 2(a) shows a block diagram of a system according to an embodiment of the invention, and is similar to the block diagram in FIG. 1(a). In this example, the seller 120 is paid on the contract payment due date by the buyer bank 112, and the buyer 110 pays the buyer bank 112 after the contract payment due date.

First, the buyer 110 and the seller 120 register with the transaction processing system 130 (step 170). Then, as described previously and as shown by reference number 11 in FIG. 2(a), the buyer 110 and the seller 120 conduct various commercial transactions using the transaction processing system 130 (step 172).

At some point in time, the buyer 110 and the seller 120 enter into a specific commercial transaction using the transaction processing system 130. As shown by reference number 12 in FIG. 2(a), the buyer bank 112 is then notified of the transaction, and the buyer bank 112 obtains the transaction information relating to the buyer 110 from the transaction processing system 130 (step 174).

As shown by reference number 13 in FIG. 2(a), the buyer bank 112 then makes an offer for delayed payment to the buyer 110 (step 176). If the offer is acceptable to the buyer 110, the buyer 110 then accepts the offer from the buyer bank 112 as shown by reference number 14 (step 178). Illustratively, in a contract for the purchase of computer monitors between the buyer 110 and the seller 120, the buyer 110 may be obligated to pay the seller 120 $300,000 on July 1. The buyer bank 112 may offer to pay the seller 120 the contract amount of $300,000 on July 1, but may not require payment by the buyer 110 until November 1. In exchange for this loan, the buyer 110 may be charged a fee. The fee may be a flat fee or may be a percentage of the transaction amount.

Buyer bank 112 then advances funds to the transaction processing system 130 (step 180). Before or after this, the buyer 110 instructs the transaction processing system 130, which communicates with the buyer bank 112, to release payment on the contract payment due date (step 182).

Figure 2B:
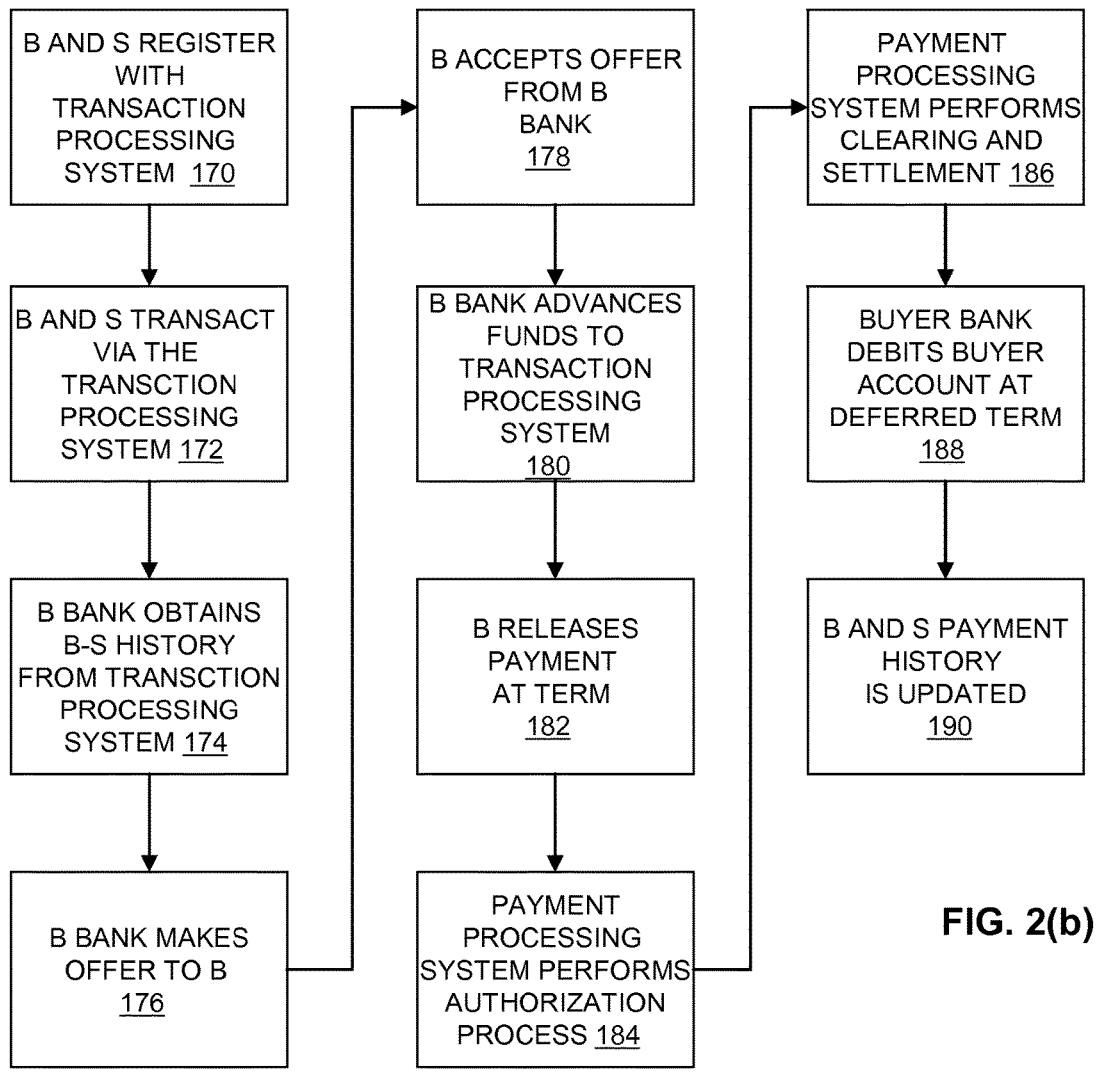
FIG. 2(b) shows a flowchart illustrating steps in a payment history payable discounting process flow according to an embodiment of the invention.

As shown by FIG. 2(b), and reference numbers 15, 16, and 17 in FIG. 2(a), the payment processing system 140 performs an authorization process (step 184) and also a clearing and settlement process (step 186) (as previously described). As shown by reference number 18 in FIG. 2(a), the bank account of the seller 120 at the seller's bank 122 is credited on the contract payment due date, after the seller bank 122 receives the funds.

As shown by reference number 19 in FIG. 2(a), the bank account of the buyer 110 is then debited at a time that is later than the contacted payment time (step 188).

After the commercial transaction is completed, the transaction history of the buyer 110 and the seller 120 are updated in the history database 130(b) (step 190).

Figure 3A:
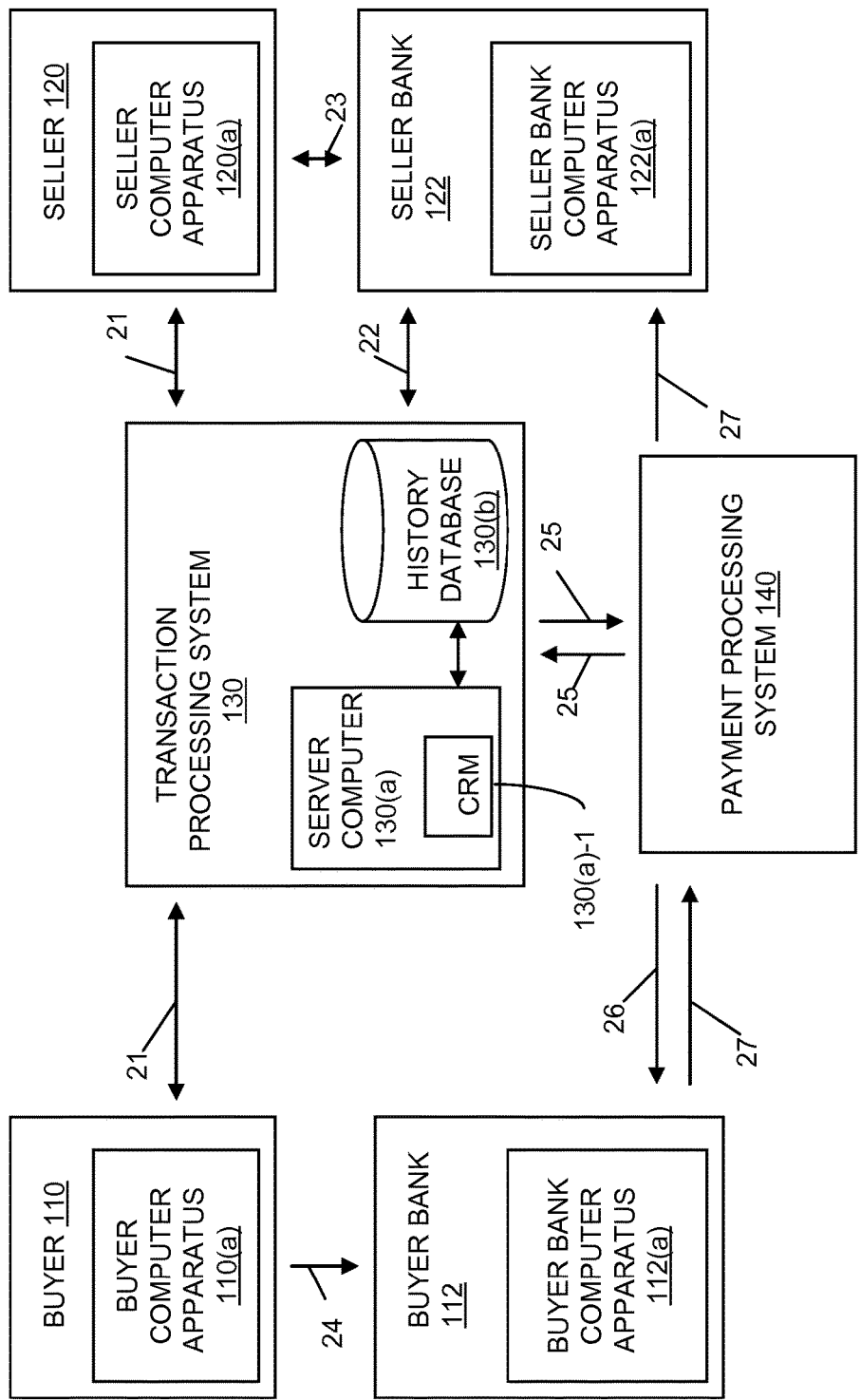
FIG. 3(a) shows a block diagram of a system. A payment history distribution process flow is also illustrated.
Figure 3B:
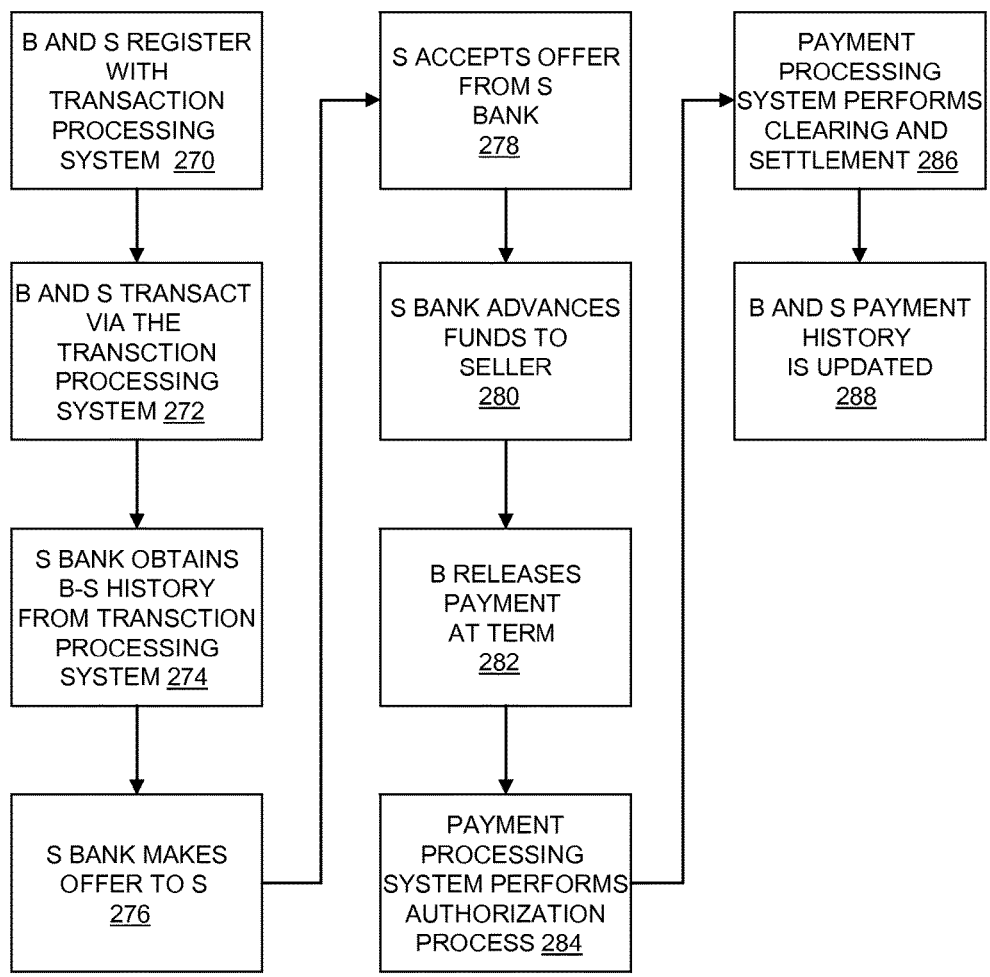
FIG. 3(b) shows a flowchart illustrating steps in a payment history distribution process flow according to an embodiment of the invention.

A payment history distribution process can be described with reference to FIGS. 3(a) and 3(b). FIG. 3(a) shows a block diagram of a system according to an embodiment of the invention, and is similar to the block diagram in FIG. 1(a). In this example, the seller bank 122 (instead of the buyer bank 112) advances funds to the seller 120 in advance of a contracted payment due date.

As in prior embodiments, the buyer 110 and the seller 120 register with the transaction processing system 130 (step 270). Then, as described previously and as shown by reference number 21 in FIG. 3(a), the buyer 110 and the seller 120 conduct various commercial transactions using the transaction processing system 130 (step 272).

At some point in time, the buyer 110 and the seller 120 are involved in a specific commercial transaction. As shown by reference number 22 in FIG. 3(a) the seller bank 122 is then notified of the transaction, and the seller bank 122 obtains the transaction information relating to the buyer 110 from the transaction processing system 130 (step 274).

As shown by reference number 23, the seller bank 122 then makes an offer to the seller 120 for advanced payment (step 276), and the seller 120 accepts the offer from the seller bank 122 (step 278). The seller bank 122 then advances funds to the seller 120 on a date that is before the contract payment due date (step 280).

At some point in time, the buyer 110 then releases the payment at term (i.e., on the contract payment due date) (step 282). The payment processing system 140 then performs an authorization, clearing and settlement process as previously described (steps 284 and 286) as shown by reference numbers 25, 26, and 27.

After the commercial transaction is completed, the transaction history of the buyer and the seller are updated in the history database 130(b) (step 288).

Figure 4A:
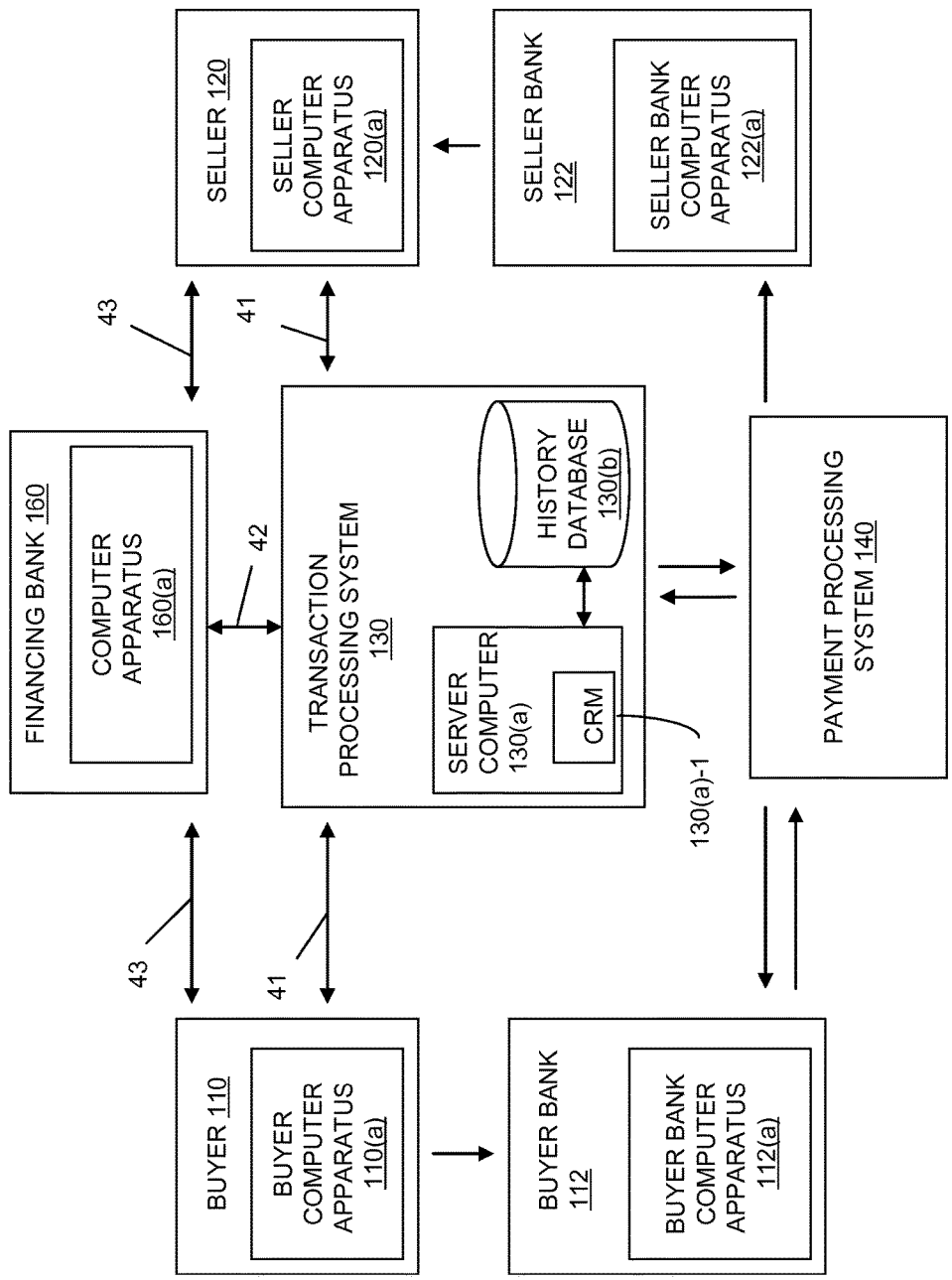
FIG. 4(a) shows a block diagram of a system. A third party financing process flow is also shown.
Figure 4B:
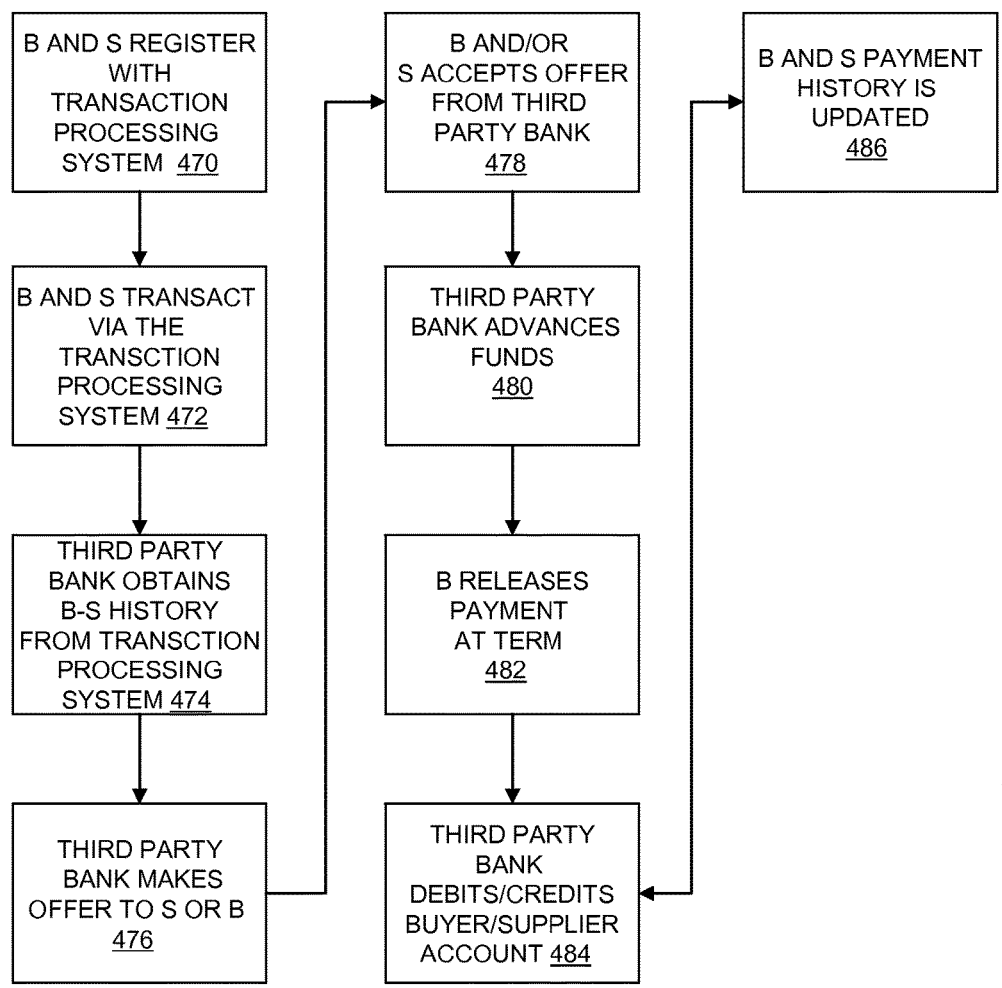
FIG. 4(b) shows a flowchart illustrating steps in a third party financing process flow according to an embodiment of the invention.

A third party financing and discounting process can be described with reference to FIGS. 4(a) and 4(b). FIG. 4(a) shows a block diagram of a system according to an embodiment of the invention, and is similar to the block diagram in FIG. 1(a), except that a third party financing bank 160 is also shown. The third party financing bank 160 also comprises at least one computer apparatus 160(a). This example illustrates that a third party financing entity (e.g., an entity not specifically affiliated with the buyer 110 or the seller 120) may finance the buyer 110 or the seller 120, instead of the buyer bank 112 or the seller bank 122.

As described above, the buyer 110 and the seller 120 register with the transaction processing system 130 (step 470). Then, as described previously and as shown by reference number 41 in FIG. 4(a), the buyer 110 and the seller 120 conduct various transactions using the transaction processing system 130 (step 472).

At some point in time, the buyer 110 and the seller 120 enter into a specific commercial transaction. As shown by reference number 42 in FIG. 4(a), the third party bank 160 is then notified of the transaction, and the third party bank 160 obtains the transaction information relating to the buyer 110 from the transaction processing system 130 (step 474).

As shown by reference number 43 in FIG. 4(a), the third party bank 160 then makes an offer to the seller 120 for advanced debit, or to the buyer 110 for deferred debit, similar to the manner described above (step 476). The buyer 110 or the seller 120 then accepts the offer from the third party bank 160 (step 478). Then, the third party bank 160 advances the funds to the seller 120 earlier than the payment term or at the payment term, depending upon whether the offer was made to the seller 120 for advanced debit or to the buyer 110 for deferred debit (step 480).

The buyer 428 then releases the payment at term (step 482), and the third party bank 160 can send funds to the buyer bank 112 or the seller bank 122 as appropriate (step 484).

After the commercial transaction is completed, the transaction history of the buyer and the seller are updated in the history database 130(b) (step 288).

Figure 5A:
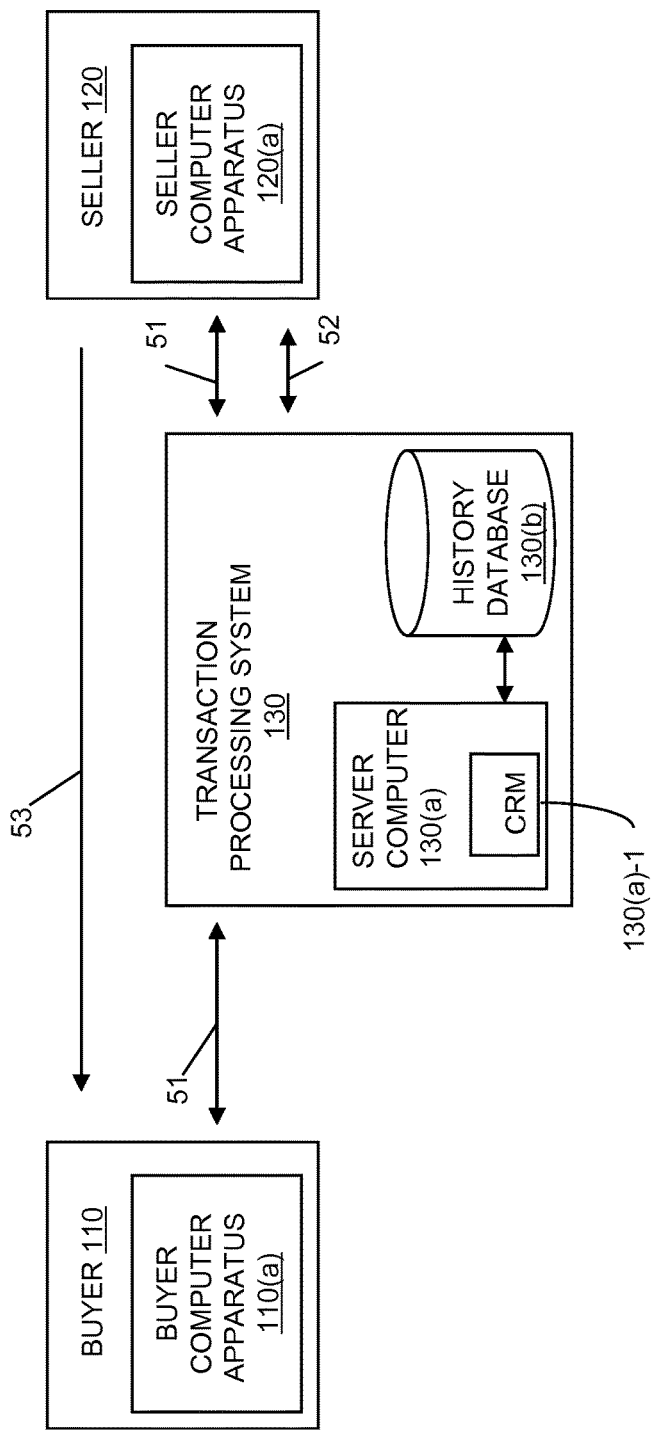
FIG. 5(a) shows a block diagram of a system. A payment history supply-chain process flow is also shown.
Figure 5B:
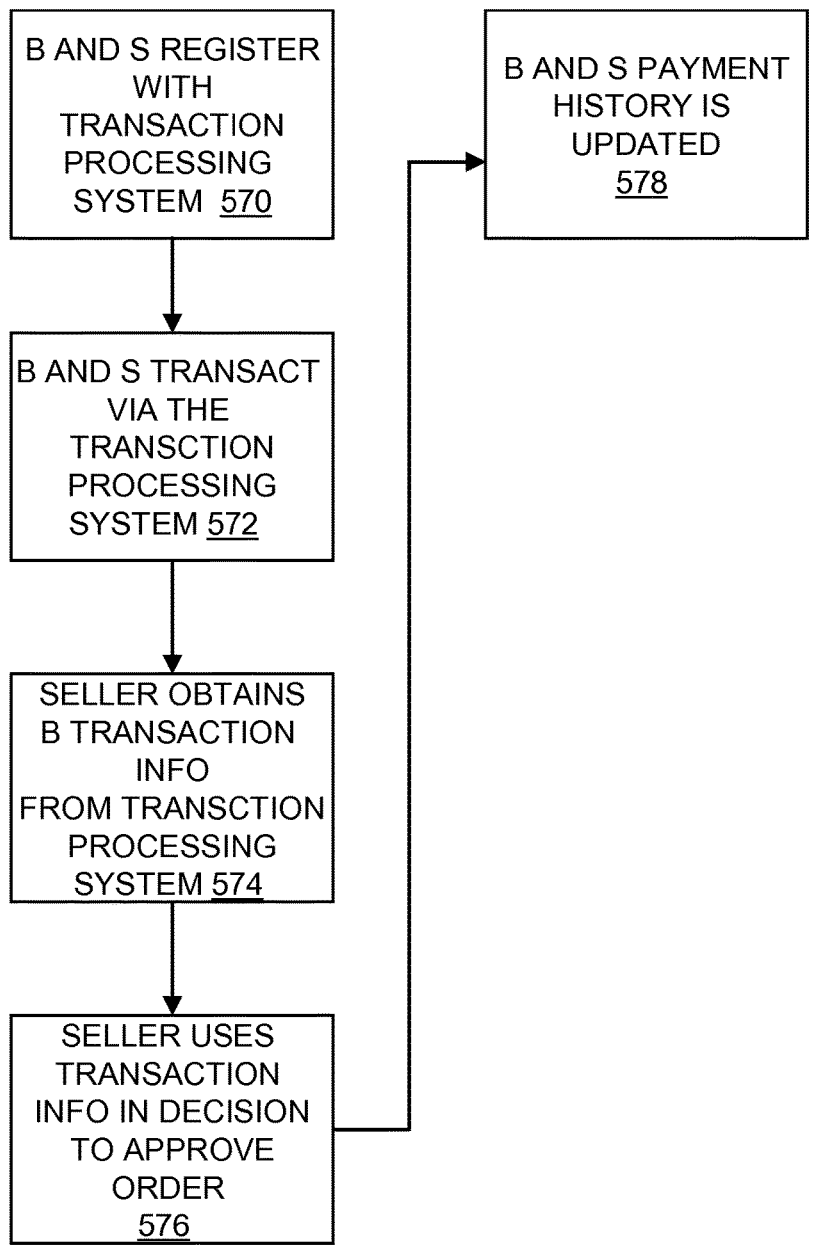
FIG. 5(b) shows a flowchart illustrating steps in a payment history supply-chain process flow according to an embodiment of the invention.

A payment history supply process can be described with reference to FIGS. 5(a) and 5(b). FIG. 5(a) shows a block diagram of a system according to an embodiment of the invention, and has components that are also shown in FIG. 1(a). However, in FIG. 5(a), a buyer bank, a seller bank, and a payment processing system are not shown. In this example, payment history information is used by a seller 120 to make a determination as to whether or not to ship goods to the buyer 110 based on the buyer's prior transaction history.

As discussed above, the buyer 110 and the seller 120 register with the transaction processing system 130 (step 570). Then, as described previously and as shown by reference number 51 in FIG. 5(a), the buyer 110 and the seller 120 conduct various transactions using the transaction processing system 130 (step 572). As shown by reference number 52 in FIG. 5(a), the seller bank 120 is then notified of the transaction, and the seller bank 120 obtains the transaction information relating to the buyer 110 from the transaction processing system 130 (step 574).

As shown by reference number 53, the seller 120 then uses the transaction information to decide whether or not to ship the goods (step 576). For example, if after receiving the transaction information the seller 120 believes that the seller 120 is not likely to get paid on time and/or in full, the seller 120 may thereafter decide to not ship the goods to the buyer 110. On the other hand, if the transaction information indicates that the buyer 110 is a good risk, then the seller 120 may ship the goods to the buyer 110.

After the commercial transaction between the buyer 110 and the seller 120 is completed, the transaction history of the buyer 110 and the seller 120 are updated in the history database 130(b) (step 578).

Figure 6A:
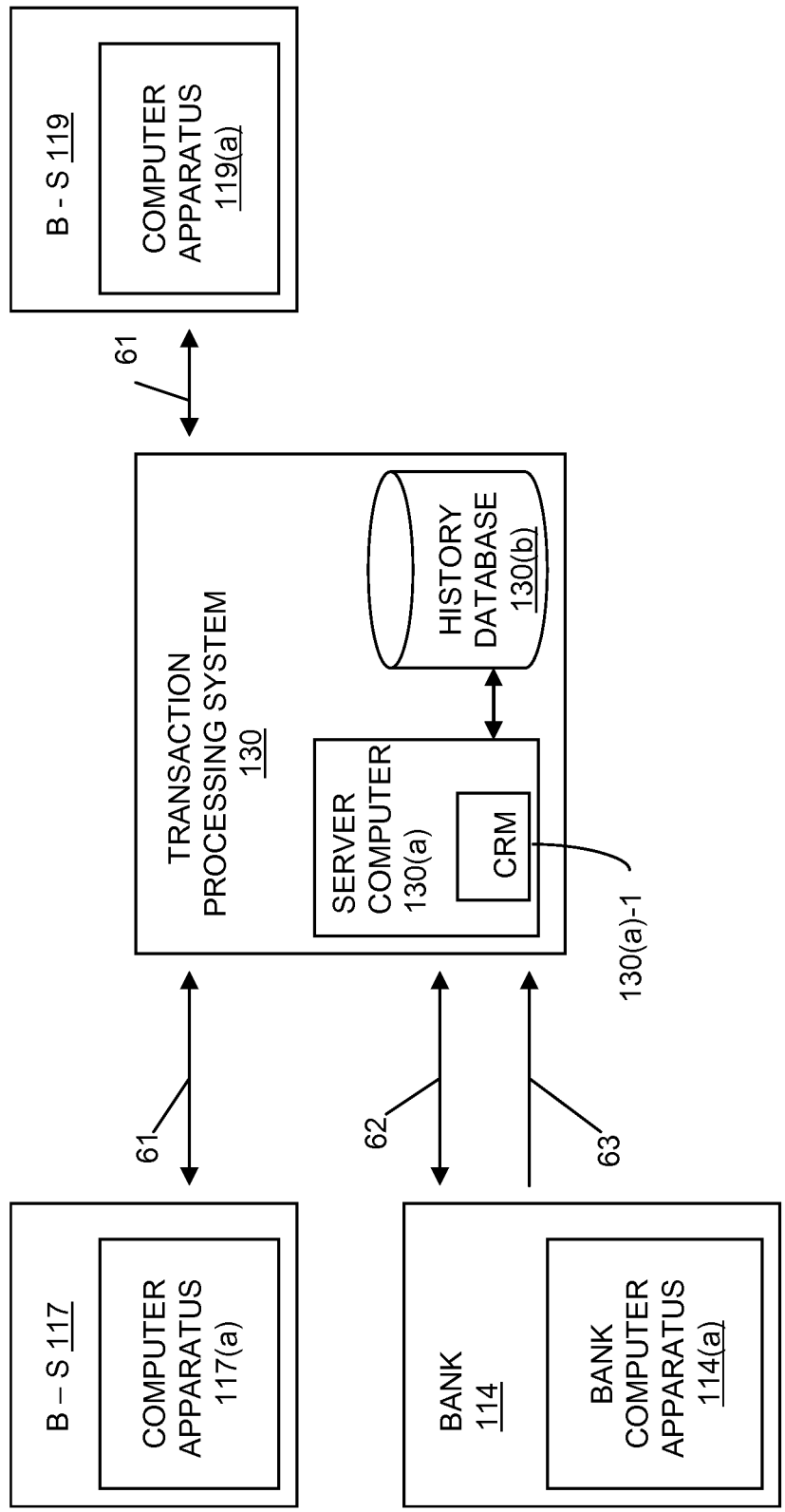
FIG. 6(a) shows a block diagram of a system. A payment history matching process flow is also shown.
Figure 6B:
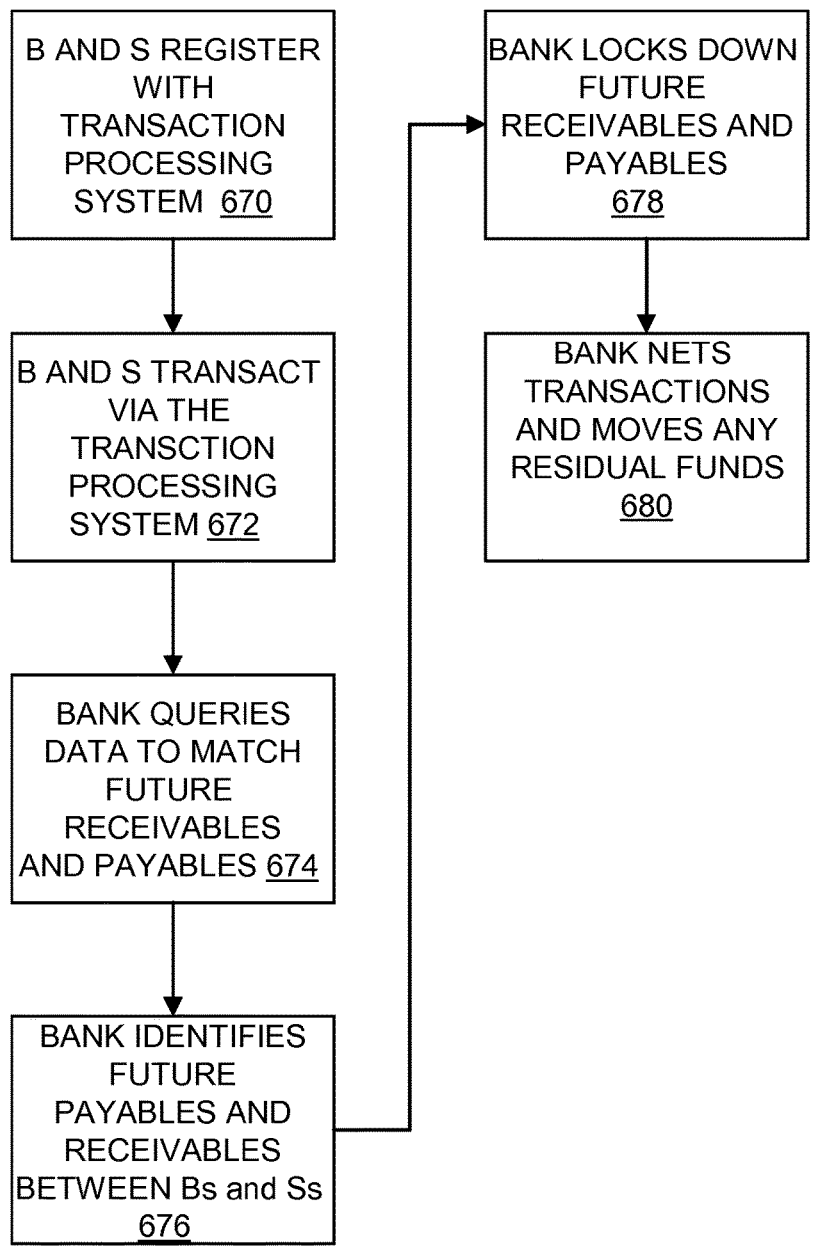
FIG. 6(b) a flowchart illustrating steps in a payment history matching process flow according to an embodiment of the invention.

A payment history matching process can be described with reference to FIGS. 6(a) and 6(b). FIG. 6(a) shows a block diagram of a system according to an embodiment of the invention, and has components that are also shown in FIG. 1(a). In FIG. 6(a), a generic bank 114 is shown as being in communication with the transaction processing system 130. The generic bank 114 has at least one computer apparatus 114(a). The generic bank 114 may be a buyer bank, a seller bank, or some other entity.

Also, in this example, there are two buyer/seller (B-S) entities 117, 119, each with a computer apparatus 117(a), 119(a). The B-S entities 117, 119 function as both buyers and sellers of goods and services. An example of a B-S entity might be a computer manufacturer which sells computers to retail stores, but also buys parts for building the computers. In this example, after receiving payment history information, payables and receivables can be matched. This matching service can be provided for banks, and can identify future accounts receivable to be secured for accounts payable (asset financing, collateralization, etc).

First, the B-S entities 117, 119 register with the transaction processing system 130 (step 670). Then, as described previously and as shown by reference number 61 in FIG. 6(a), the B-S entities 117, 119 conduct various transactions using the transaction processing system 130 (step 672). As shown by reference number 62 in FIG. 6(a), the bank 114 obtains the transaction information relating to the B-S entities 117, 119.

The bank 114 queries the transaction data to match future payables and receivables between the entities 117, 119, and then identifies the future receivables and payables between the different B-S entities 117, 119 (steps 674, 676). The payment histories of the B-S entities 117, 119 can be matched after the bank 114 determines that a particular B-S entity has a good receivable (i.e., a receivable that is likely to be paid) that can match to a good payable (i.e., a payable that is likely to be paid).

After the bank 114 identifies future receivables and payables that can be matched, the bank 114 then locks down future receivables and matches them to payables (step 678). At the date of the term, the bank 114 nets transactions and moves any residual funds (step 680). Lastly, as in prior embodiments, the transaction histories of any of the B-S entities 117, 119 can be updated in the history database 130(b).

Embodiments of the invention have a number of advantages. In embodiments of the invention, a transaction processing system provides entities such as sellers and banks (or other financial institutions) with detailed transaction information about a particular buyer or seller so that subsequent financing or transactional decisions can be made. The transaction information can include raw or processed transaction data relating to the buyer or seller's transaction history. The transaction information that is obtained from the transaction processing system is timely, accurate and accessible to such entities. Also, buyers and sellers such as corporations may use the transaction information from the transaction processing system to make trade decisions and/or seek financing and/or discounting from banks or other financial entities. Also, because the transaction processing system that is used in embodiments of the invention monitors the commercial transactions conducted by a plurality of buyers and sellers, embodiments of the invention can also be used to provide some fraud control on receivables, because all parties to the commercial transactions being conducted are known. Lastly, financial entities such as banks can also bid on non-customer discounting/financing decisions in a marketplace environment.

Embodiments of the invention have a number of additional advantages. For example, in embodiments of the invention, the buyer or seller can solicit financing offers in the transaction processing system, and may let any bank in communication with the transaction processing system provide an offer for financing.

Lastly, note also, that for corporations, embodiments of the invention can be used to develop a blind peer pool for benchmarking accounts payable and accounts receivable functions. Corporations can review this pool based upon industry, commodity, company size, etc.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. Moreover, one or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, by a transaction processing system, transaction data relating to a plurality of commercial transactions conducted by a plurality of buyers and sellers conducting commercial transactions using the transaction processing system comprising a server computer, wherein the transaction processing system is coupled to a payment processing system which is adapted to process credit and debit transactions, wherein at least some of the plurality of commercial transactions involve the buyers supplying physical products to the sellers;

receiving, by the transaction processing system, a request for transaction information relating to the received transaction data from a financing bank computer after the financing bank computer is notified of a commercial transaction between a buyer and a seller that has a contract payment due date;

determining and providing, by the transaction processing system, the transaction information to the financing bank computer, wherein, upon receiving the transaction information from the transaction processing system, the financing bank computer offers a delayed payment to the buyer for the commercial transaction;

after the financing bank computer accepts the delayed payment for the commercial transaction from the buyer and on the contract payment due date, transmitting, by the transaction processing system, a communication to the payment processing system to initiate a transfer of funds from the financing bank computer to a seller bank computer associated with the seller;

receiving, by the payment processing system, the communication to initiate the transfer of funds from the transaction processing system;

initiating, by the payment processing system, the transfer of funds by sending an authorization request message requesting authorization for the transfer of funds to the financing bank computer;

receiving, by the payment processing system, an authorization response message from the financing bank computer indicating an approval of the transfer of funds; and after receiving the authorization response message, performing, by the payment processing system, a clearing and settlement process between the financing bank, the seller bank, and the payment processing system for the transfer of funds associated with the authorization request and response messages, and wherein an account of the buyer is debited after the contract payment due date in response to the offer and acceptance of delayed payment.

2. The method of claim 1, wherein the transaction information comprises risk information, wherein the risk information comprises a risk rating for the buyer or the seller.

3. The method of claim 1, wherein the financing bank computer comprises a buyer bank computer.

4. The method of claim 1, wherein the financing bank computer comprises a seller bank.

5. The method of claim 1 further comprising receiving funds advanced by the financing bank computer, after providing the transaction information.

6. The method of claim 1, wherein a payment due date is associated with the commercial transaction, and wherein the method further comprises receiving funds advanced by the financing bank computer and then forwarding the funds to the seller on an advance payment date prior to the payment due date.

7. The method of claim 1, wherein a payment due date is associated with the commercial transaction, and wherein the method further comprises:
 receiving funds advanced by the financing bank computer and then forwarding the funds to the seller on an advance payment date prior to the payment due date; and
 debiting an account of the buyer on the payment due date.

8. The method of claim 1 further comprising:
 updating a history database after the commercial transaction is conducted.

9. The method of claim 1 further comprising:
 providing risk information to the seller, wherein the risk information helps the seller determine whether or not to ship goods associated with the commercial transaction.

10. The method of claim 1, wherein the transaction information comprises future receivable information and future payable information associated with the buyer or the seller, wherein the financing bank computer matches payables and receivables after the transaction information is provided to the financing bank computer.

11. A system comprising:
 a transaction processing system configured to receive transaction data relating to a plurality of commercial transactions conducted by a plurality of buyers and sellers conducting commercial transactions using the transaction processing system, receive a request for transaction information relating to the received transaction data from a financing bank computer after the financing bank computer is notified of a commercial transaction between a buyer and a seller that has a contract payment due date, determine and provide the transaction information to the financing bank computer, wherein, upon receiving the transaction information from the transaction processing system, the financing bank computer offers a delayed payment to the buyer for the commercial transaction; and
 a payment processing system operatively coupled to the transaction processing system, wherein the payment processing system is configured to process credit and debit transactions, initiate a transfer of funds from the financing bank computer after the financing bank computer accepts the delayed payment for the commercial transaction from the buyer and on the contract payment due date, the initiation of the transfer of funds conducted by sending an authorization request message to the financing bank computer requesting authorization for the transfer of funds to the financing bank computer, and receiving an authorization response message from the financing bank computer indicating an approval of the transfer of funds,
 wherein the financing bank computer is different than the buyer and the seller, and wherein a clearing and settlement process of at least some of the credit and debit transactions is performed by the payment processing system after receiving the authorization response message, and
 wherein an account of the buyer is debited after the contract payment due date in response to the offer and acceptance of delayed payment.

12. The system of claim 11 further comprising a buyer bank computer and a seller bank computer operatively coupled to the payment processing system.

13. The method of claim 1, wherein the transaction information includes information regarding late payment, short payments, and payments declined for insufficient funds.

14. The method of claim 1, wherein the buyer is a buyer-seller financing bank computer, which both buys and sells goods and services.

15. The method of claim 1, wherein the buyer and seller are both buyer-seller entities, which both buy and sell goods and services.

16. The method of claim 1, wherein the transaction information is used to identify sources for asset financing or collateral.

17. The method of claim 1 further comprising:
 sending, by the payment processing system, the authorization request message to the financing bank computer; and
 receiving, by the payment processing system, the authorization response message from the financing bank computer.

18. The method of claim 1, wherein the financing bank computer is a buyer bank computer, and wherein the buyer pays the buyer bank computer for the transaction after the clearing and settlement process is performed.

19. The method of claim 18, wherein the transaction information comprises information regarding average and current net positions of the buyer's accounts receivables and accounts payables.

20. The method of claim 1, wherein the transaction processing system matches and locks down future transactions associated with the buyer.

21. The method of claim 1 further comprising:
 determining a risk rating using the transaction information or the transaction data; and
 providing an offer for a discounted amount based on the risk rating.

22. The method of claim 1, wherein the transaction information or the transaction data comprises payments declined for insufficient funds.

* * * * *